(12) United States Patent
Sugiue

(10) Patent No.: US 8,654,252 B2
(45) Date of Patent: Feb. 18, 2014

(54) ELECTRONIC DEVICE AND INFORMATION PROCESSING PROGRAM

(75) Inventor: Yuki Sugiue, Tokyo (JP)

(73) Assignee: Sony Corporation (JP)

(*) Notice: Subject to any disclaimer, the term of this patent is extended or adjusted under 35 U.S.C. 154(b) by 145 days.

(21) Appl. No.: 13/065,415

(22) Filed: Mar. 22, 2011

(65) Prior Publication Data

US 2011/0242416 A1    Oct. 6, 2011

(30) Foreign Application Priority Data

Mar. 30, 2010    (JP) ................ P2010-078240

(51) Int. Cl.
*H04N 5/445*    (2011.01)
(52) U.S. Cl.
USPC ........... 348/552; 348/553; 348/563; 348/567; 348/423.1; 725/153; 725/145
(58) Field of Classification Search
USPC ............. 348/552, 567, 714, 715, 423.1, 553, 348/569, 563; 725/145, 148, 153; 345/547
See application file for complete search history.

(56) References Cited

U.S. PATENT DOCUMENTS

2010/0238183 A1*   9/2010   Sakanaka et al. ............. 345/501

FOREIGN PATENT DOCUMENTS

JP    2009-116483 A    5/2009

* cited by examiner

*Primary Examiner* — Jefferey Harold
*Assistant Examiner* — Jean W Desir
(74) *Attorney, Agent, or Firm* — Lerner, David, Littenberg, Krumholz & Mentlik, LLP

(57) ABSTRACT

There is provided an electronic device and an information processing program, which may provide a user with information about functions of the electronic device without stress to the user. The electronic device includes: a holding section holding plural pieces of function-introductory information each concerning a plurality of functions of the electronic device; a determination section selecting one out of the plural pieces of function-introductory information, and determining the selected piece of function-introductory information as transmission information to be transmitted to an external display device; and an output section outputting the transmission information.

11 Claims, 14 Drawing Sheets

DISPLAY METHOD OF SECOND DISPLAY

| | COMPARATIVE EXAMPLE 1 (MANUAL DISPLAY) | COMPARATIVE EXAMPLE 2 (POPUP DISPLAY) | EXAMPLE (DISPLAY ON SECOND DISPLAY) |
|---|---|---|---|
| FREQUENCY (THE NUMBER OF OPPORTUNITIES) | × | ○ | ○ |
| STRESS (INTRODUCTION TIMING) | ○ | △ | ○ |
| INFORMATION CAPACITY (AREA OR DISPLAY TIME OF INTRODUCTION SCREEN) | ○ | × | ○ |

FIG. 7

ELECTRONIC DEVICE AND INFORMATION PROCESSING PROGRAM

CROSS-REFERENCE TO RELATED APPLICATION

The present application claims priority from Japanese Patent Application No. JP 2010-078240 filed in the Japanese Patent Office on Mar. 30, 2010, the entire content of which is incorporated herein by reference.

BACKGROUND OF THE INVENTION

1. Field of the Invention

The present invention relates to an electronic device performing information processing for presenting functions of the device to a user, and an information processing program used for such an electronic device.

2. Description of Related Art

An electronic device such as a TV (Television) apparatus has recently had various functions including a function (an electronic manual) used to present a use procedure of each of the functions on a screen. A user may understand and use the functions of the electronic device by using the electronic manual. A system using such an electronic manual includes, for example, a system used in the case of failure of an electronic device, which enables a manual or test tool necessary for repairing the failure to be displayed on a screen of a portable terminal (for example, see Japanese Unexamined Patent Publication No. 2009-116483).

SUMMARY OF THE INVENTION

In the functions of the electronic device, some function is not known by a user, and therefore a function is sometimes not used by a user despite the fact that the function is useful for the user. Therefore, so-called popup display is used as a method for notifying (introducing) to a user various functions of the electronic device, for example, in such a manner that a small window screen is automatically displayed in a part of a screen, and information about a function is presented on the window screen.

However, in the information display method using the popup display, since the window screen is automatically displayed in a part of a screen of a TV apparatus or the like, image display or other user operation may be obstructed. Moreover, since information is displayed regardless of user intention, if the information is unnecessary for the user, the user tends to be subjected to mental stress. Therefore, it has been desired to present the various functions of the electronic device without stress to a user so as to improve user convenience.

It is desirable to provide an electronic device and an information processing program, which may provide a user with information about functions of the electronic device without stress to the user.

An electronic device according to an embodiment of the invention includes a holding section holding plural pieces of function-introductory information each concerning a plurality of functions of the electronic device; a transmission information determination section selecting one out of the plural pieces of function-introductory information, and determining the selected piece of function-introductory information as transmission information to be transmitted to an external display device; and an output section outputting the transmission information.

The function-introductory information is to notify a user of (to allow a user to recognize) presence of a function, or to allow a user to take interest in the function, and, for example, includes a summary or an advantage of the function.

An information processing program according to an embodiment of the invention allows a computer to select one out of the plural pieces of function-introductory information each concerning a plurality of functions of an electronic device having the computer, and to determine the selected piece of function-introductory information as transmission information to be transmitted to an external display device; and then to output the determined transmission information.

In the electronic device and the information processing program according to the embodiments of the invention, a piece of function-introductory information selected from the plural pieces of function-introductory information about a plurality of functions is determined as transmission information to an external display device and outputted. In other words, the selected piece of function-introductory information is displayed on the external display device instead of a screen of the electronic device.

According to the electronic device and the information processing program of the embodiments of the invention, a piece of function-introductory information is selected from the plural pieces of function-introductory information about a plurality of functions, and the selected piece of function-introductory information is determined as transmission information to an external display device and outputted. Consequently, the selected piece of function-introductory information is displayed, for example, on another display device disposed beside a user at any time rather than on a screen of the electronic device. Therefore, information about a function may be presented without discomfort to a user looking a screen of an electronic device. Accordingly, information about functions of the electronic device may be provided without stress to the user.

Other and further objects, features and advantages of the invention will appear more fully from the following description.

BRIEF DESCRIPTION OF THE DRAWINGS

FIG. 7 is a table for illustrating effects of the first embodiment.

DETAILED DESCRIPTION OF THE PREFERRED EMBODIMENTS

Hereinafter, preferred embodiments of the invention will be described in detail with reference to drawings. Description is made in the following sequence.

1. First embodiment (example of transmission of function-introductory information and function-briefing information from TV apparatus to second display)
2. Modification 1 (example of another screen display operation in second display)
3. Modification 2 (example of another information transmission operation in TV apparatus)
4. Second embodiment (example of transmission of function-introductory information and function-briefing information of video camera to second display via TV apparatus)

First Embodiment

Figure 1:
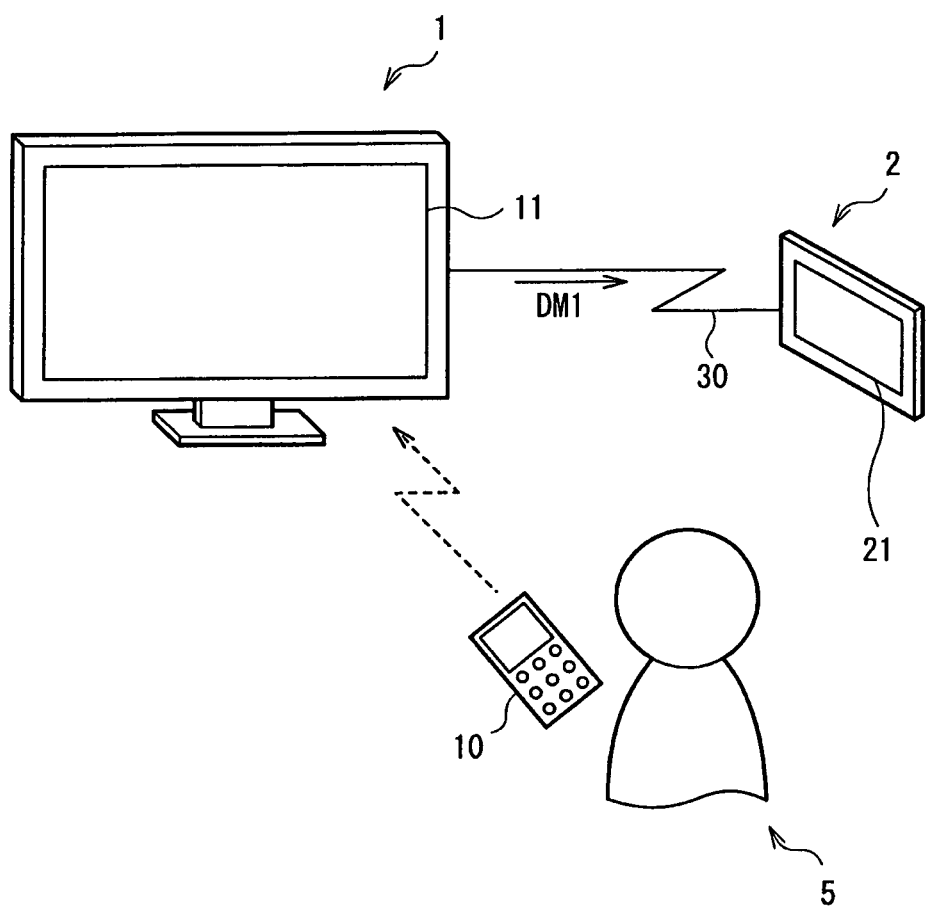
FIG. 1 is a schematic diagram showing an arrangement of a TV apparatus (electronic device) and a second display according to a first embodiment of the invention.

FIG. 1 schematically shows an arrangement example of an electronic device (TV apparatus 1) and a second display 2 according to a first embodiment of the invention. The TV apparatus 1 has a plurality of functions, and holds electronic manual information (function-introductory information DM1 and function-briefing information DM2 described later) about the functions. The functions include, for example, a program list display, audiovisual program reservation, video recording reservation, USB content reproduction, watching and listening of internet video, and watching and listening of 3D content.

The second display 2 is connected to the TV apparatus 1 via a wiring line 30. The second display 2 is, for example, disposed beside a user 5 facing a display section of the TV apparatus 1 to display a screen (function introduction screen or function explanation screen described later) based on information received from the TV apparatus 1.

An information processing program of the embodiment corresponds to various information processing functions realized in software of the TV apparatus 1 as an electronic device. Here, the software includes a program group that allows a computer in the electronic device to execute the information processing functions. For example, each program may be beforehand incorporated into special hardware for use or installed for use from a network or a recording medium into a general-purpose personal computer. An information processing program of another embodiment described later also corresponds to various information processing functions realized in software of an electronic device of a corresponding embodiment, and may be used in the same way as above.

Configuration of TV Apparatus 1 and the Like

Figure 2:
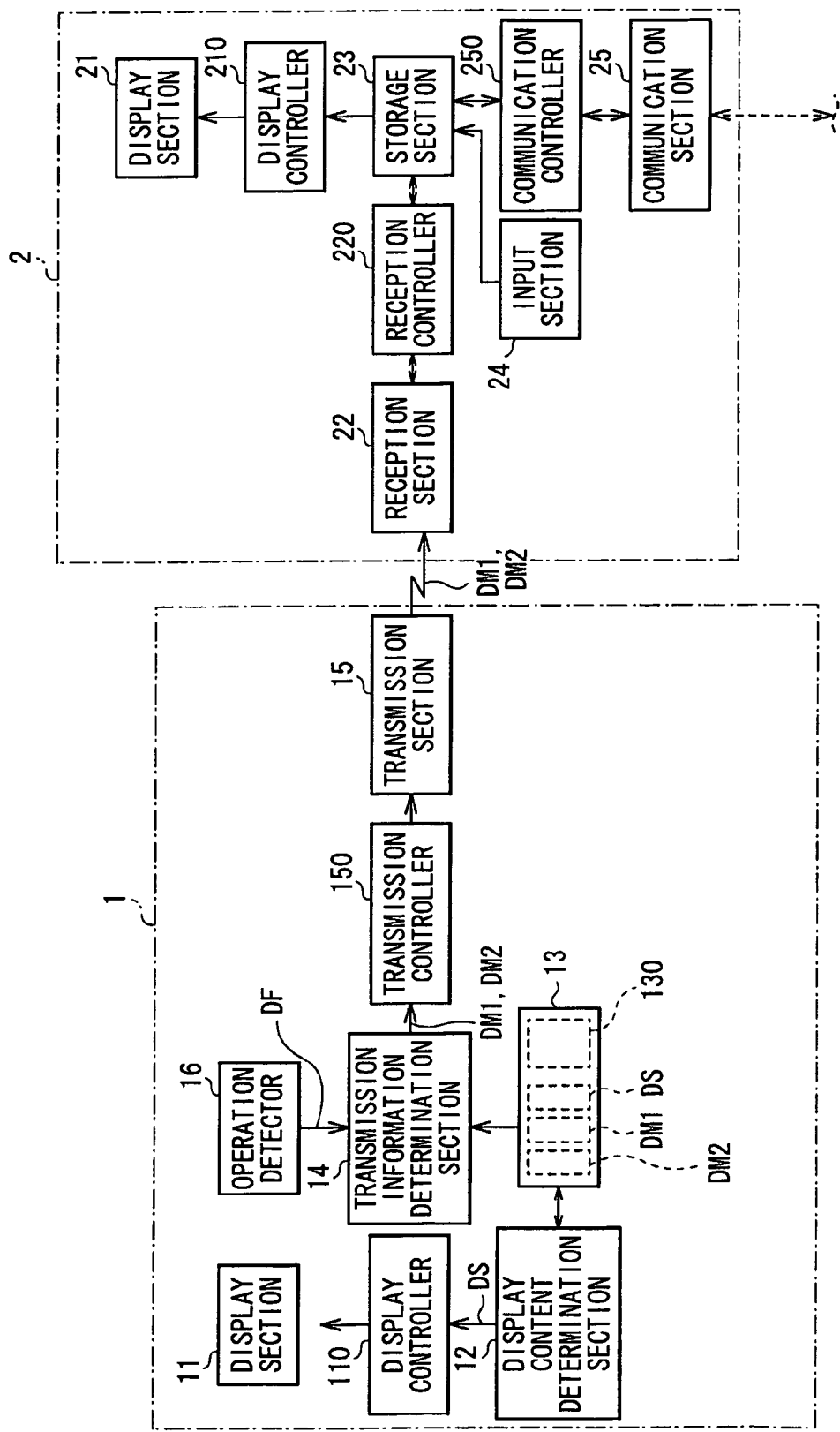
FIG. 2 is a block diagram showing a detailed configuration example of each of the TV apparatus and the second display shown in FIG. 1.

FIG. 2 shows a detailed block configuration of each of the TV apparatus 1 and the second display 2.

TV Apparatus 1

The TV apparatus 1 has the display section 11, a display controller 110, a display content determination section 12, a holding section 13, a transmission information determination section 14, a transmission section 15, a transmission controller 150 and an operation detector 16. A tuner and the like for achieving a TV function are omitted to be shown herein (the same is true in another embodiment described later).

The display section 11 performs normal image display, and besides, for example, performs display of an operation screen for using each function based on input operation by the user 5 (based on detection data DF inputted from the operation detector 16). The display section 11 includes, for example, an LCD (Liquid Crystal Display), a PDP (Plasma Display Panel) or an organic EL (Electro Luminescence) display. The display controller 110 performs predetermined display control of the display section 11.

The holding section 13 is, for example, a storage section (memory) for holding data for displaying an operation screen (operation screen data DS), data about each function (function-introductory information DM1 and function-briefing information DM2) and a correspondence table 130. In particular, each of the operation screen data DS, the function-introductory information DM1 and the function-briefing information DM2 are held by two or more. The correspondence table 130 is used for determination operation of a recommended function described later while holding one function set in correspondence to particular operation. A storage medium for the holding section 13 may include a fixed disc and a removable disc. In addition, various kinds of media such as a magnetic disc, an optical disc, a magneto-optical disc, and a semiconductor memory may be used as the medium. Alternatively, information may be stored on the network.

The function-introductory information is to notify a user of (to allow a user to recognize) existence of functions of the TV apparatus 1 or is to allow a user to take interest in the functions, and includes, for example, a summary or an advantage of each function. The function-briefing information is to allow a user to understand content of such functions so that the user advances operation, and includes, for example, explanation of a specific operation procedure or a relevant function. In addition, the function-briefing information may include information to allow a user to memorize existence or an operation method of each function. For example, the function-briefing information may include information about a difficulty of a function so that such a difficulty is displayed to ask a user if the user may utilize the function. The function-briefing information may include explanation information about a function that has ever been used. Alternatively, in a particular function explanation screen, URL about other functions that have ever been used may be displayed. The function-introductory information DM1 or the function-briefing information DM2 may represent such information by itself, or may be information indicating an internet site having such information (for example, URL (Uniform Resource Locator).

The display content determination section 12 determines the content displayed by the display section 11, for example, based on input operation by the user 5. For example, when a function to be used is selected by the user 5, the section 12 allows the display section 11 to display an operation screen corresponding to the selected function. Specifically, the section 12 acquires one operation screen data DS from the plurality of operation screen data DS held in the holding section 13 based on detection data DF, and supplies the acquired operation screen data DS to the display controller 110. Determination (selection) of the function to be used is performed by, for example, operation of the user 5 (for example, operation using a remote control 10), namely, performed manually.

The operation detector 16 has a function to detect predetermined operation (function selection operation and input operation on an operation screen) by the user 5. Specifically, the operation detector 16 supplies detection data DF (data indicating whether operation is detected) as a result of such detection to the transmission information determination section 14, as described later.

The transmission information determination section acquires a piece of function-introductory information DM1 and a piece of function-briefing information DM2 from the plural pieces of function-introductory information DM1 and of function-briefing information DM2 held in the holding section respectively, and determines the acquired information DM1 and DM2 as transmission information to be transmitted to the second display 2 owned by the user 5. In the embodiment, for example, the section 14 determines a function (recommended function) depending on a current use condition or operation history of the TV apparatus 1, and determines function-introductory information DM1 and function-briefing information DM2 about the recommended function as the transmission information. Here, for example, the section 14 uses the correspondence table 130 held in the holding section 13 to determine the recommended function. Specifically, for example, in the case that "program-list display function" is set in correspondence to "channel zapping (changing) operation" in the correspondence table 130, when channel zapping operation is detected during use of the TV apparatus 1, the section 14 determines "program-list display" as the recommended function.

The transmission section 15 transmits to the second display 2 the function-introductory information DM1 and the function-briefing information DM2 determined as the transmission information. The transmission controller 150 supplies to the transmission section 15 the function-introductory information DM1 and the function-briefing information DM2 supplied from the transmission information determination section 14, and controls transmission operation of the section 15. A method of transmitting the function-introductory information DM1 and the function-briefing information DM2 by the transmission section 15 may include not only wire communication using the wiring line 30 but also wireless communication.

Second Display 2

The second display 2 includes a display section 21, a display controller 210, a reception section 22, a reception controller 220, a storage section 23, an input section 24, a communication section 25 and a communication controller 250. A display device such as a digital photo frame or PC (Personal Computer), which may be continuously securely set on a predetermined place (rested on a wall, placed on a stand, or the like), is desirably used as the second display 2. However, this is not limitative, and other display devices such as a remote controller with a display, a mobile phone, or PDA (Personal Digital Assistant) may be used as long as such a device may communicate with the TV apparatus 1 and thus may perform screen display based on transmission information from the TV apparatus 1.

The reception section 22 receives the function-introductory information DM1 and the function-briefing information DM2 transmitted from the transmission section 15 of the TV apparatus 1. The reception controller 220 controls reception operation of the reception section 22, and supplies the received function-introductory information DM1 and function-briefing information DM2 to the storage section 23.

The storage section 23 is a memory for holding various data including the function-introductory information DM1 and the function-briefing information DM2 supplied from the reception controller 220, and various storage media may be used for the section 23 like the holding section 13.

The display section 21 is used to display the various data (including the function-introductory information DM1 and the function-briefing information DM2) held in the storage section 23, and may include various kinds of displays like the display section 11. The display controller 210 performs predetermined display control of the display section 21.

The input section 24 is used to input predetermined information into the second display 2, and includes, for example, a keyboard, a touchpad, or a touch panel.

The communication section 25 performs communication operation with an external network server, for example, in the case that display content of function introduction and of function explanation is held in the external network server (in the case that URL of each of function-introductory information DM1 and function-briefing information DM2 as the display content is received from the server). The communication controller 250 controls communication operation and the like of the communication section 25.

Operation and Effects of TV Apparatus 1

Figure 3:
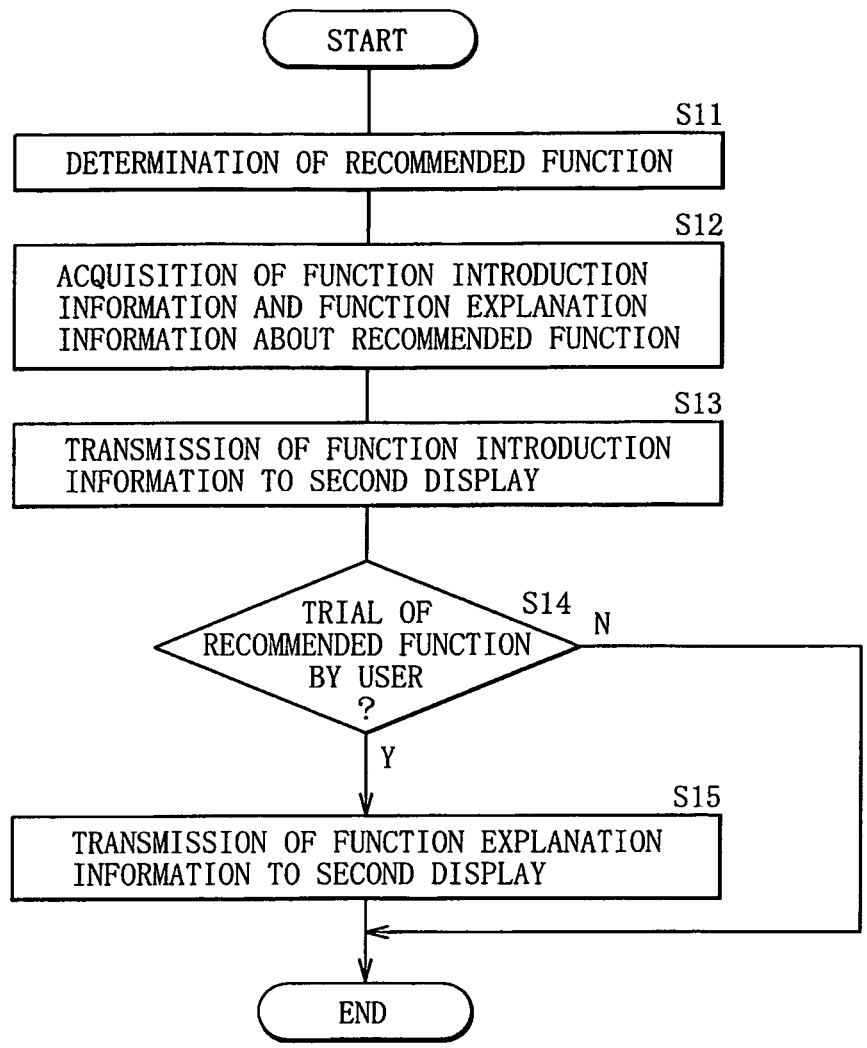
FIG. 3 is a flowchart showing an example of transmission operation of function-introductory information in the TV apparatus shown in FIG. 1.

Next, operation and effects of the TV apparatus 1 of the embodiment are described. FIG. 3 shows flow of transmission operation of function-introductory information DM1 and function-briefing information DM2 in the TV apparatus 1.

In the TV apparatus 1, a recommended function for the user 5 (function to be estimated to be useful for the user 5) is determined from a plurality of functions of the TV apparatus 1 depending on, for example, a current use condition or operation history of the user 5 (step S11). Specifically, the transmission information determination section 14 uses the correspondence table 130 held in the holding section 13 to determine the function based on a current use condition or operation history of the user 5. Specifically, in the correspondence table 130, for example, a function of "program list display" is set in correspondence to "channel zapping (changing) operation" as the use condition, and a function of "audiovisual reservation" is set in correspondence to "program list display operation". In other words, when channel zapping operation is detected during use of the TV apparatus 1, "program list display" or "audiovisual reservation" is determined as the recommended function. Here, input operation by the user 5 is performed by, for example, the remote control 10, and is supplied to the transmission information determination section 14 as detection data DF via the operation detector 16. Hereinafter, description is made assuming that the recommended function determined in this way is called recommended function M for convenience.

The correspondence table 130, storing operation history of the user 5, may hold the operation history set in correspondence to functions. Specifically, the table 130 stores information about use frequency of each function (for example, "program list display is frequently used" or "audiovisual reservation has never been used") or information about presence of particular operation being repeated (for example, "a certain program is viewed after a channel is changed every week"). Such stored information may be used to determine the recommended function M. For example, "recommended point" is prepared for each function in the correspondence table 130, and the recommended point is decreased in a function that has been ever used or is frequently used, and increased in a function about a particular operation being repeated. Specifically, when the same program is watched and listened after a channel is changed every week, the recommended point is increased in "audiovisual reservation". The recommended function M may be determined based on such relative largeness of the recommended point.

Next, the transmission information determination section 14 acquires from the holding section 13 function-introductory information DM1 and function-briefing information DM2 about the recommended function M determined in the above way (step S12).

Then, the section 14 first determines the function-introductory information DM1 as transmission information to be transmitted to the second display 2. The function-introductory information DM1 is supplied from the transmission information determination section 14 to the transmission controller 150. The transmission controller 150 controls the transmission section 15 to transmit the function-introductory information DM1 to the second display 2 (step S13).

Next, whether the recommended function M has been tried by the user 5 is determined (step S14). Specifically, the section 14 determines whether the operation detector 16 has detected an input signal (utilization determination signal) indicating that the recommended function M is used (tried) as detection data DF. When the input signal has not been detected (step S14: N), the processing is finished. When the utilization determination signal of the recommended function M has been detected (step S14: Y), the section 14 determines function-briefing information DM2 corresponding to the recommended function M (the function-briefing information DM2 acquired in the step S12) as the transmission information, and transmits the determined information DM2 to the second display 2 (step S15). The utilization determination signal is inputted to the TV apparatus 1, for example, through operation of the remote control 10.

Figure 4:
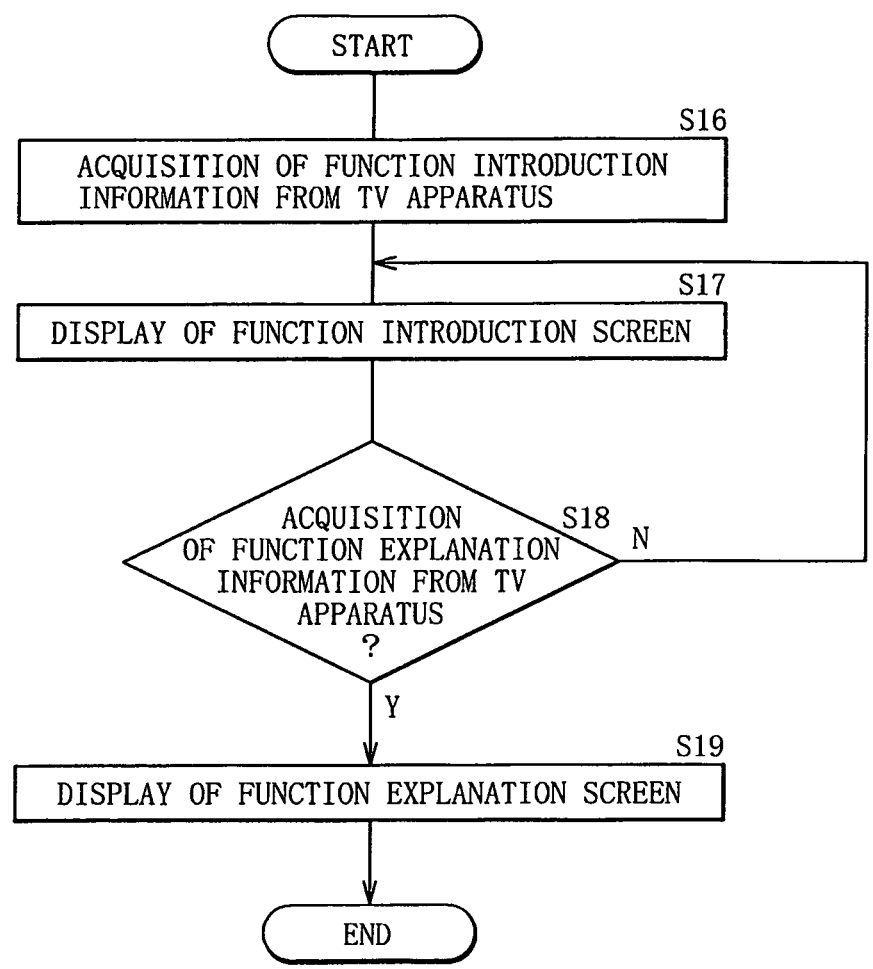
FIG. 4 is a flowchart showing an example of acquisition/display operation of function-introductory information in the second display shown in FIG. 1.
Figure 5A:
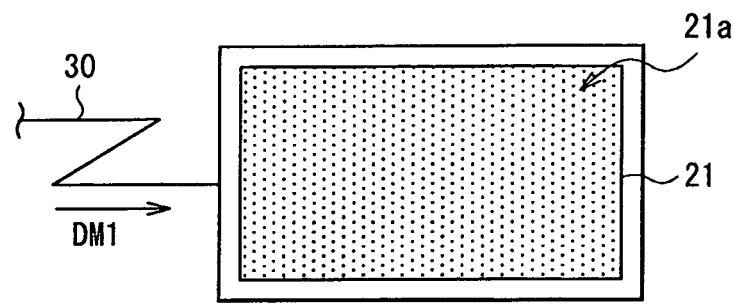
FIGS. 5A to 5C are schematic diagrams for illustrating screen change operation in the second display shown in FIG. 1.
Figure 5B:
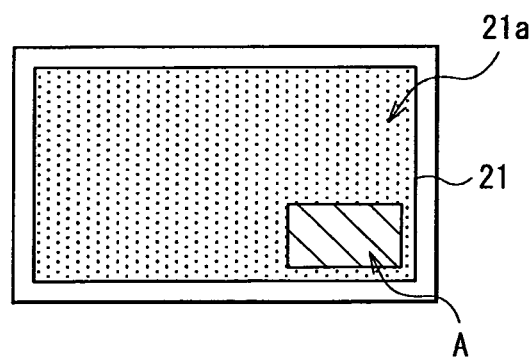
Figure 5C:
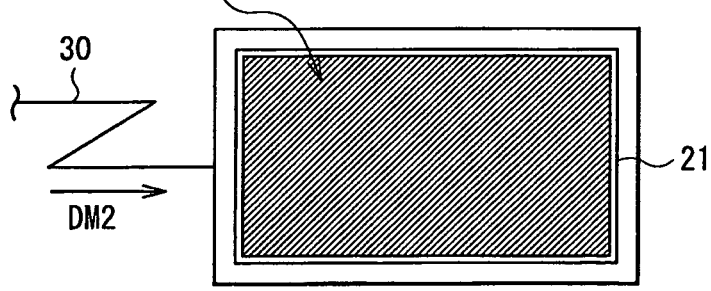

In the second display 2, the function-introductory information DM1 is received, for example, in the following way, and the display section 21 performs display based on the received function-introductory information DM1. FIG. 4 shows flow of acquisition/display operation of the function-introductory information DM1 and the function-briefing information DM2 in the second display 2. FIGS. 5A to 5C schematically show change operation of screen display in the second display 2.

In the second display 2, first, the function-introductory information DM1 about the recommended function M is acquired from the TV apparatus 1 through the wiring line 30 (step S16). Specifically, the reception controller 220 controls the reception section 22 to receive the function-introductory information DM1 about the recommended function M, and then the received function-introductory information DM1 is supplied to the storage section 23. The display controller 210 controls the display section 21 to display a function introduction screen (function introduction screen A) based on the function-introductory information DM1 (step S17).

For example, when the function-introductory information DM1 is received (FIG. 5A), the display controller 210 controls the display section 21 to display a function introduction screen A in a part of a screen 21a of the display section 21 (FIG. 5B). When the recommended function M is, for example, "audiovisual reservation", information including a summary or an advantage of "audiovisual reservation", such as "a channel is automatically changed at the time of program start" or "the desired program will not be missed", is displayed on the function introduction screen A.

Such a function introduction screen A is continuously displayed on the display section 21 until the user 5 performs new operation to the TV apparatus 1. Specifically, after the function introduction screen A is displayed, whether function-briefing information DM2 is acquired is determined (step S18), and when the information DM2 is not acquired (step S18: N), the function introduction screen A is continued to be displayed (return to the step S17). When the function-briefing information DM2 is acquired (step S18: Y), display on the display section 21 is changed from the function introduction screen A to a function explanation screen B (step S19). For example, as shown in FIG. 5C, when the function-briefing information DM2 is acquired, the display controller 210 controls the display section 21 to display the function explanation screen B over the whole area of the screen 21a of the display section 21. When the recommended function M is, for example, "audiovisual reservation", information including a specific operation procedure about "audiovisual reservation" is displayed on the function introduction screen A, the information including "when you select and determine a program from a program list, a program explanation screen is displayed", "when you select and determine an audiovisual reservation button in a bottom of a screen, a confirmation screen is displayed", or "when you select and determine a determination button after confirming a date and a name of a program, you can set the program to be repeated every week".

Figure 6A:
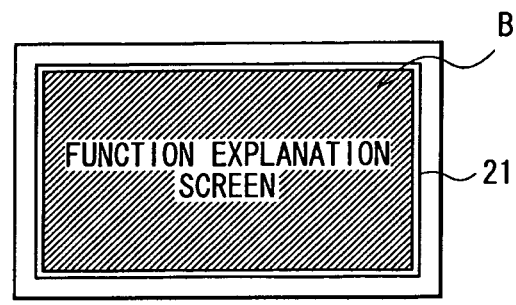
FIGS. 6A to 6C are schematic diagrams showing an example of screen display patterns in the second display shown in FIG. 1.
Figure 6B:
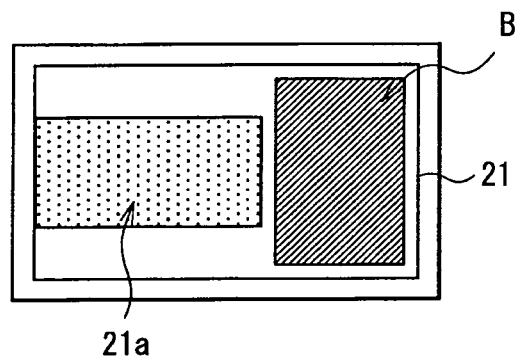
Figure 6C:
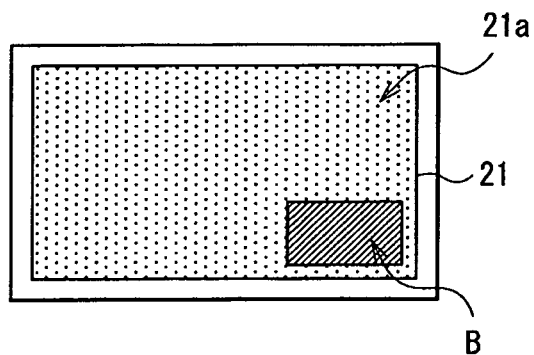

While a method of displaying the function explanation screen B on the display section 21 of the second display 2 has been described herein with a case as an example where the screen B is displayed over the whole area of the display section 21 (FIG. 6A), the method is not limitative. For example, a display frame for a function explanation screen may be provided separately from a display frame of the normal screen 21a (FIG. 6B), or the function explanation screen may be displayed in a part of the normal screen 21a (FIG. 6C). Moreover, in the case that the function explanation screen is displayed in a part of the normal screen 21a, area, a position and the like of the function explanation screen are not particularly limited. Similarly, a display method of the function introduction screen A is not particularly limited.

As hereinbefore, in the embodiment, a recommended function M for the user 5 is determined from various functions of the TV apparatus 1, and function-introductory information DM1 about the recommended function M is determined as transmission information to the second display 2. Consequently, the function-introductory information DM1 about the recommended function M may be displayed, for example, on the second display 2 as an external display device disposed beside a user instead of the display section 11 of the TV apparatus 1.

FIG. 7 shows advantages and disadvantages (in three items of frequency, stress and information capacity) of an example (the embodiment: a case of displaying a function introduction screen on the second display) and of comparative examples 1 and 2 (a case of displaying a function introduction screen on a TV apparatus). In the comparative example 1, manual display is used to display a function introduction screen over the whole screen of a TV apparatus by operation of the user 5 using a remote control or the like. In the comparative example 2, popup display is used to automatically display a function introduction screen (window screen) in a part of the screen. The frequency indicates the number of opportunities when the user 5 may know (recognize) an unknown function, and the stress indicates a mental load caused at the timing of introduction of such an unknown function.

In this way, in the comparative example 1 using manual display, since the user 5 intentionally starts up a function introduction screen, the user 5 may not find a desired function unless the user consciously search for the function, leading to few opportunities to know an unknown function. In the comparative example 2 using popup display, since a window screen for function introduction is automatically displayed, opportunities to know an unknown function increase, but a displayed image or other operation by the user 5 may be obstructed because the window screen is displayed regardless of intention of the user 5. In some function, the number of window screens is increased, or window screens are displayed one after another whenever operation is advanced. Therefore, when information shown on a window screen is unnecessary for the user 5, the user 5 tends to be subjected to stress.

In the embodiment, since the function introduction screen A is displayed on the second display 2 based on the function-introductory information DM1 transmitted from the TV apparatus 1 as described before, opportunities to know an unknown function increase compared with a case of manual display as in the comparative example 1. In addition, since the function introduction screen A is displayed on the second display 2 different from the TV apparatus 1, a recommended function M may be presented without discomfort to the user 5 looking the display section 11 of the TV apparatus 1 unlike the case of popup display as in the comparative example 2. Accordingly, information about functions of the TV apparatus may be provided without stress to the user 5.

When display is performed step by step in such a manner that when the user 5 interestedly tries the recommended function M after being informed of a summary of the recommended function M by function-introductory information DM1, function-briefing information DM2 of a detailed procedure or the like of the recommended function M is displayed, information about the function may be clearly provided for the user 5 without stress. Moreover, since the user 5 may perform actual operation at the TV apparatus 1 while the function explanation screen B is displayed on the second display 2, the user 5 may smoothly advance operation while understanding functions of the TV apparatus 1.

The embodiment has been described with a case where the TV apparatus 1 transmits function-introductory information DM1, and then when a utilization determination signal of a recommended function M is detected from the user 5, function-briefing information DM2 is transmitted. However, the user 5 does not necessarily try the recommended function M during display of a function introduction screen A for the recommended function M, and is likely to use another function in some cases. For example, while the second display 2 displays a function introduction screen A for "program list display", a utilization determination signal of another function having no concern with "program list display", for example, a utilization determination signal of "browser function" may be detected. In such a case, the transmission information determination section 14 can re-determine a function about "browser function" (for example, bookmark function of the browser) as a recommended function M, and can determine function-introductory information DM1 about the re-determined recommended function M as transmission information.

Next, modifications (modifications 1 and 2) of the first embodiment are described. The same elements as in the first embodiment are designated by the same symbols, and description of them is appropriately omitted.

Modification 1

Figure 8A:
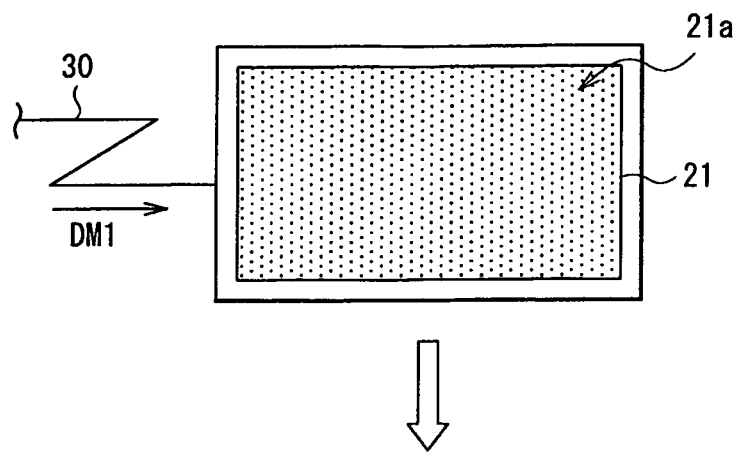
FIGS. 8A to 8C are schematic diagrams for illustrating screen change operation in a second display according to modification 1.
Figure 8B:
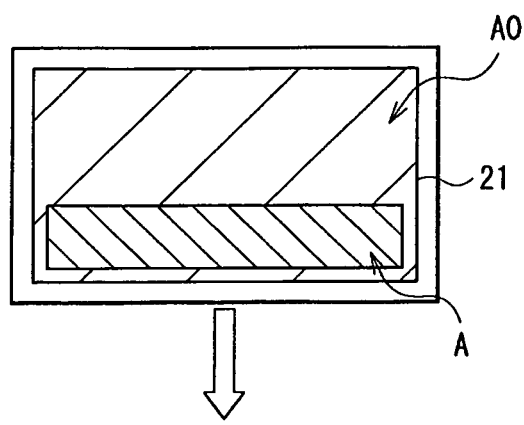
Figure 8C:
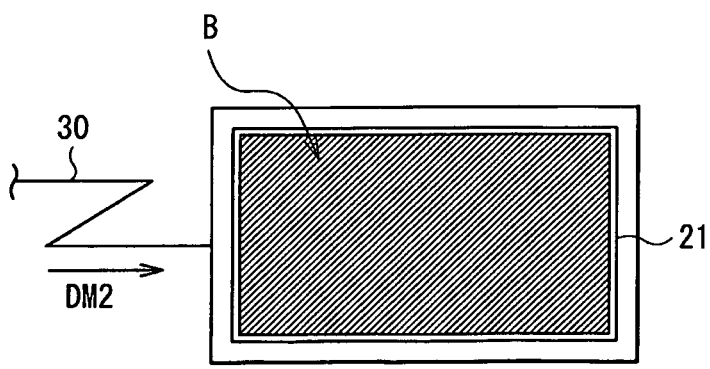

In the first embodiment, when the second display 2 receives function-introductory information DM1, a function introduction screen A is displayed on the display section 21. However, screen display may be performed on the second display 2, for example, in the following manner. As shown in FIGS. 8A to 8C, when the display section 21 displays the normal screen 21a, after function-introductory information DM1 is acquired in the same way as above, the function introduction screen A may be displayed only when an electronic manual is started. Specifically, in the second display 2, after an electronic manual is started by operation of the user 5, a function introduction screen A may be displayed based on previously acquired function-introductory information DM1 in a part of a manual start screen A0. The function introduction screen A may be displayed as a part of the manual start screen A0. Alternatively, the screen A may be displayed over the whole area of the display section 21 at the start of the electronic manual.

Figure 9:
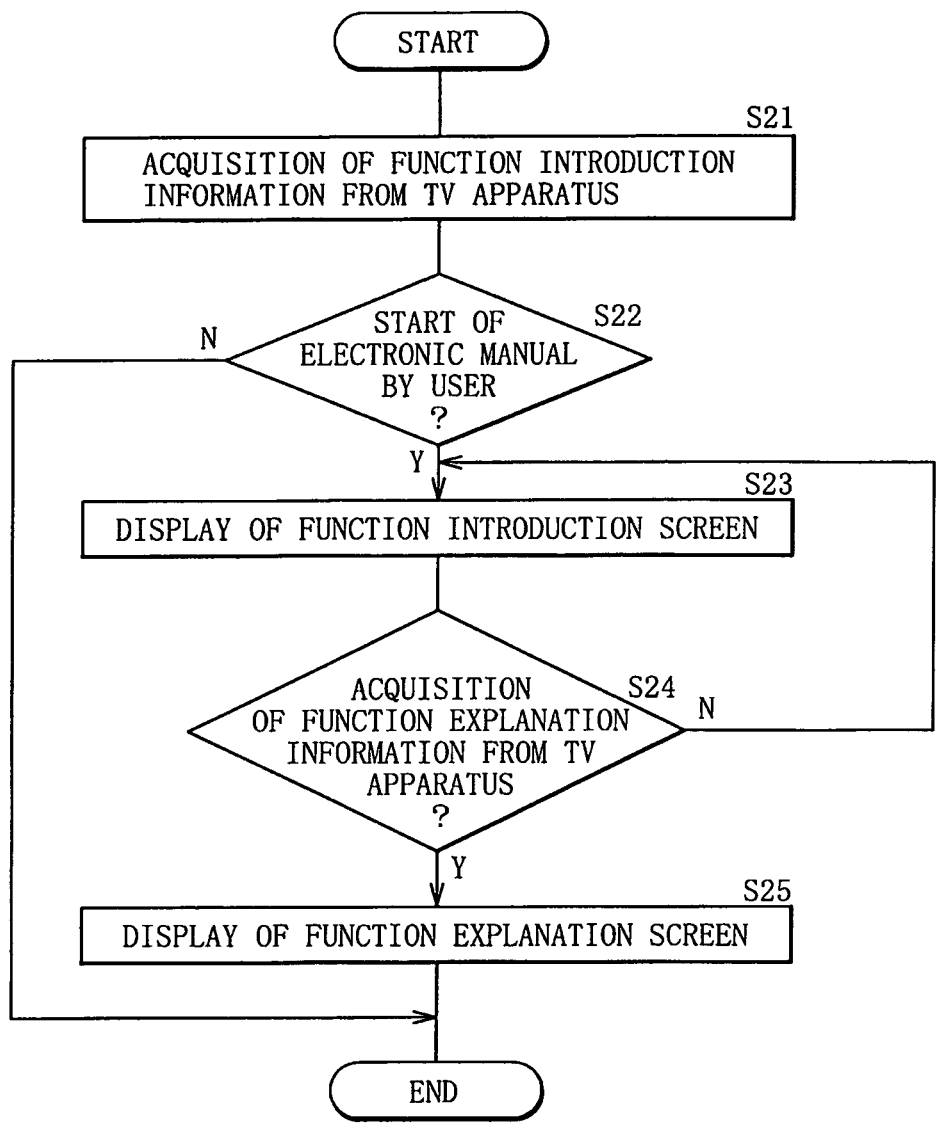
FIG. 9 is a flowchart showing an example of acquisition/display operation of function-introductory information in the second display shown in FIG. 8.

Specifically, as shown in FIG. 9, in the second display 2, function-introductory information DM1 about a recommended function M is acquired from the TV apparatus 1 via the wiring line 30 as in the step S16 (step S21). Then, in the modification, whether the electronic manual is started is determined (step S22), and when the electronic manual is started by operation of the user 5 (step S22: Y), a function introduction screen A is displayed as in the step S17 (step S23). Then, whether function-briefing information DM2 is acquired is determined as in the steps S18 and S19 (step S24), and when the information DM2 is acquired, a function explanation screen B is displayed (step S25). When the function-briefing information DM2 is not acquired, display of the function introduction screen A is continued (return to the step S23).

In this way, in the second display 2, after the function-introductory information DM1 is received from the TV apparatus 1, display based on the information DM1 need not be promptly performed, and whether the function-introductory information DM1 is to be provided may be selected depending on intention of the user 5 (for example, depending on presence of start of the electric manual).

Modification 2

Figure 10:
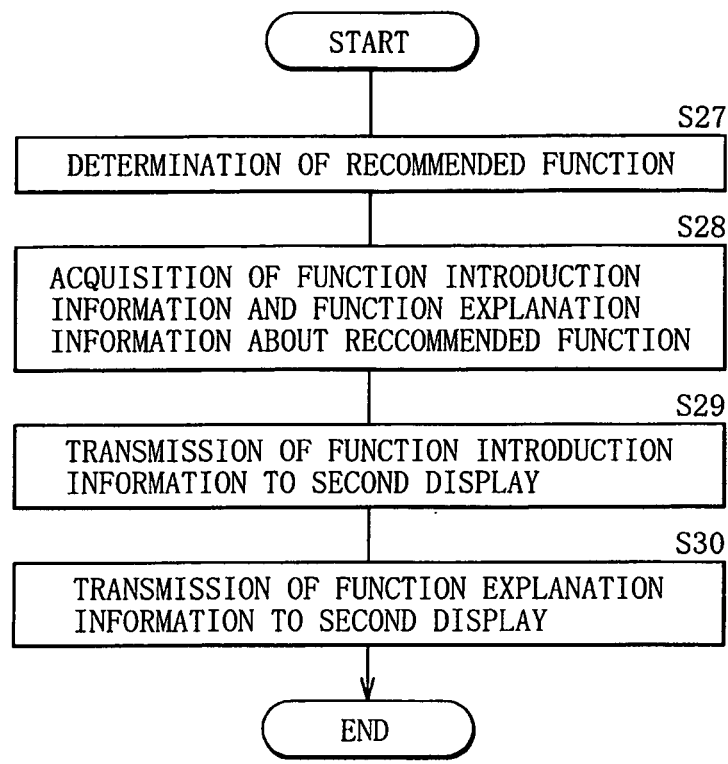
FIG. 10 is a flowchart showing an example of acquisition/display operation of function-introductory information in a TV apparatus according to modification 2.
Figure 11:
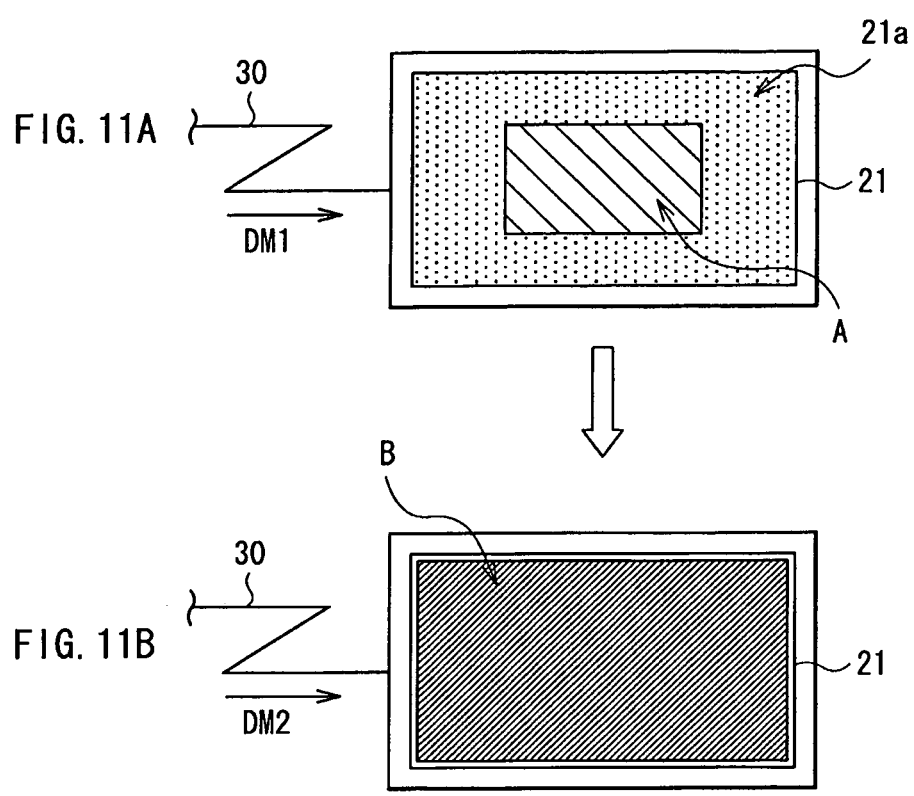
FIGS. 11A and 11B are schematic diagrams for illustrating screen change operation in a second display according to the modification 2.

In the first embodiment, function-briefing information DM2 is transmitted only when a utilization determination signal of a recommended function M given by the user 5 is detected. However, the function-briefing information DM2 may be automatically transmitted as transmission information in the following way. Specifically, as shown in FIG. 10, in a TV apparatus 1, a recommended function M is determined as in the steps S11 and S12 (step S27), and function-introductory information DM1 and function-briefing information DM2 about the function M are acquired (step S28). Then, the function-introductory information DM1 and the function-briefing information DM2 are sequentially automatically transmitted to the second display 2 (steps S29 and S30). In the second display 2, for example, a function introduction screen A is displayed on a display section 21 (FIG. 11A), and then display is automatically changed from the function introduction screen A to a function explanation screen B (FIG. 11B). Such automatic display change may be performed through transmission of a relevant control signal from the TV apparatus 1, or may be performed according to control at the second display 2.

Second Embodiment

Figure 12:
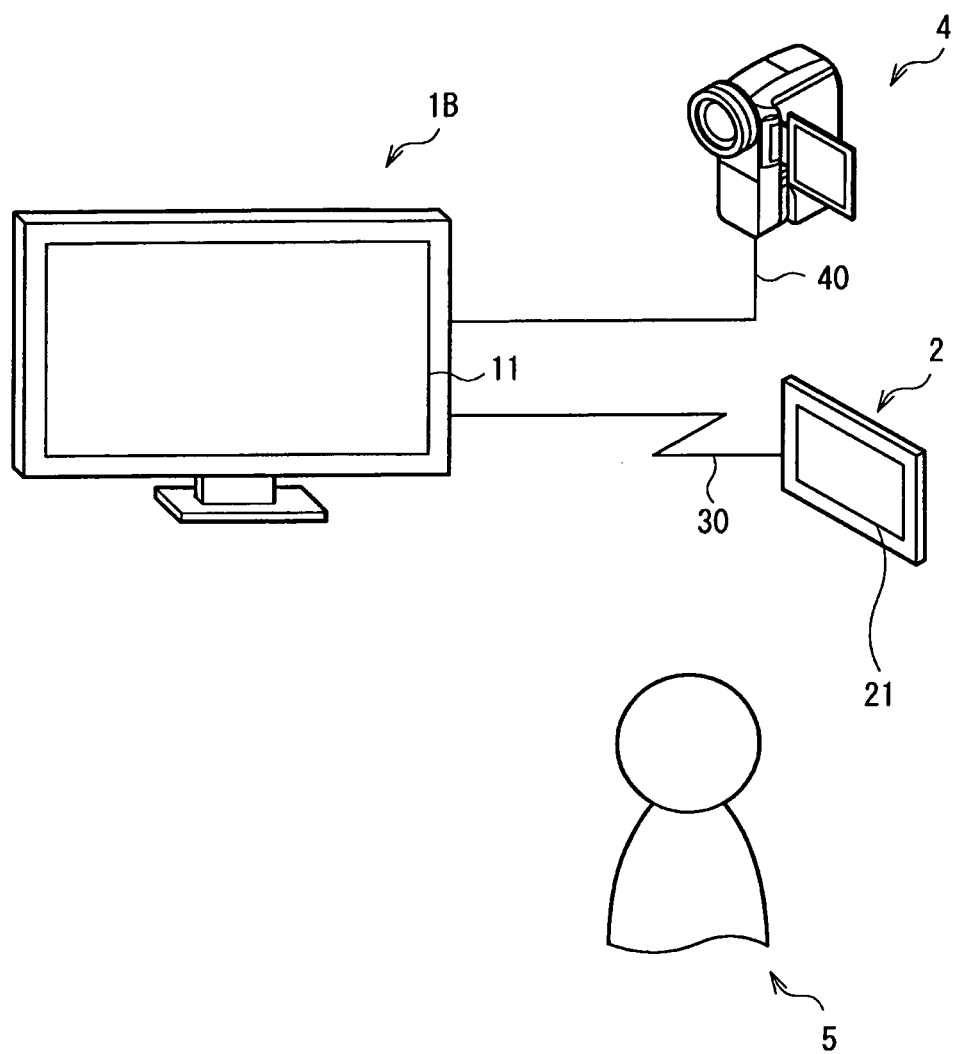
FIG. 12 is a schematic diagram showing an arrangement of a video camera (electronic device) and a second display according to a second embodiment of the invention.

FIG. 12 schematically shows an arrangement of an electronic device (video camera 4), a TV apparatus 1B and a second display according to a second embodiment. The video camera 4 is connected to the TV apparatus 1B via a predetermined wiring line 40 (for example, HDMI (High-Definition Multimedia Interface) or USB (Universal Serial Bus)). In the embodiment, electronic manual information (function-introductory information and function-briefing information) about operation of the video camera 4 is transmitted to the second display 2 via the TV apparatus 1B. In other words, a recommended function M is determined depending on a current use condition and operation history of the video camera 4, and function-introductory information DM1 and function-briefing information DM2 about the recommended function M are transmitted to the second display 2 via the TV apparatus 1B as a communication unit.

Configuration of Video Camera 4 and the Like

Figure 13:
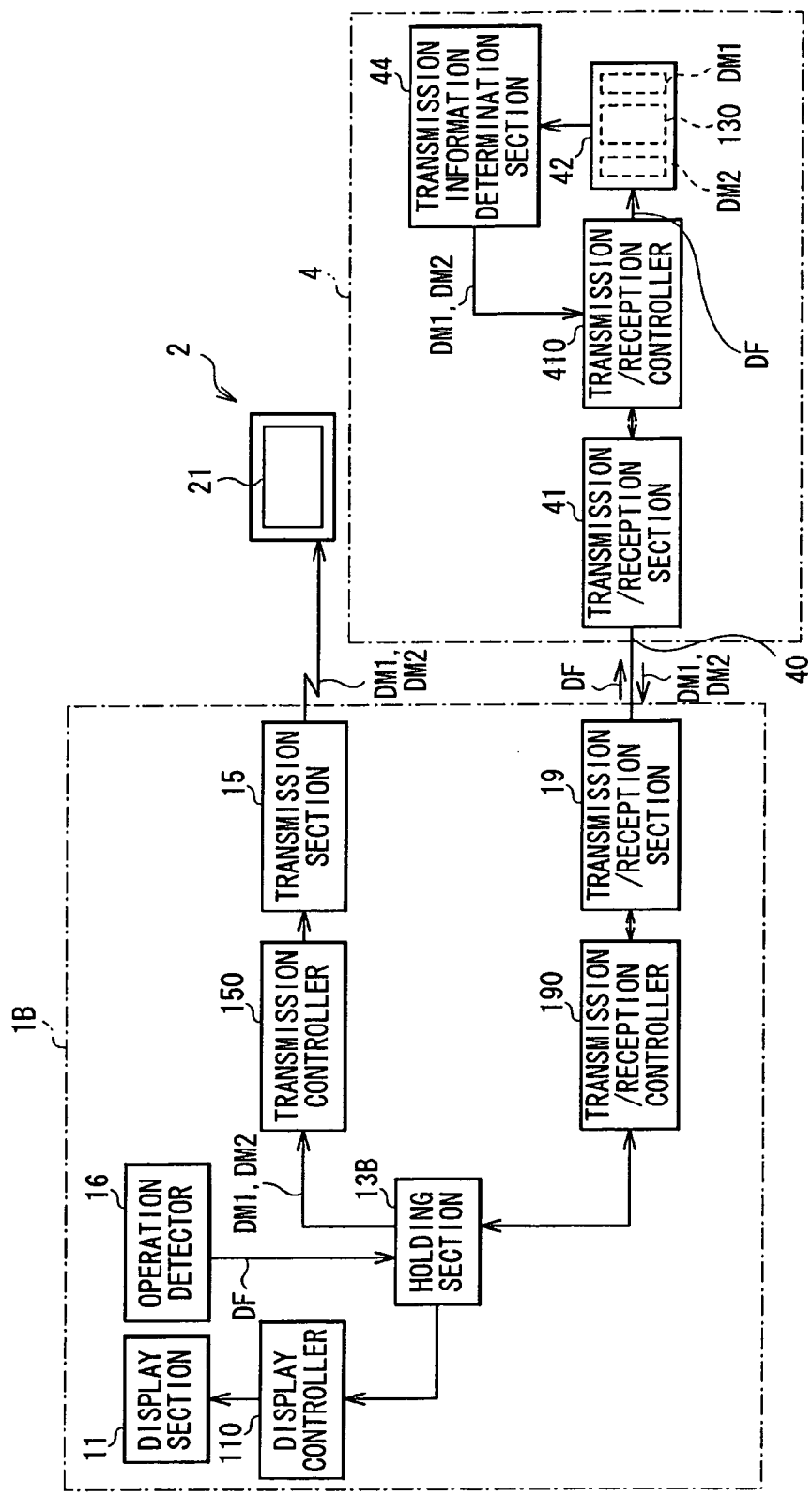
FIG. 13 is a block diagram showing a detailed configuration example of each of the video camera and a TV apparatus shown in FIG. 12.

FIG. 13 shows a detailed block configuration of each of the video camera 4 and the TV apparatus 1B. Since a block configuration of the second display 2 is the same as in the first embodiment, description of the configuration is omitted.

TV Apparatus 1B

The TV apparatus 1B includes a display section 11, a display controller 110, a holding section 13B, a transmission section 15, a transmission controller 150, an operation detector 16, a transmission/reception section 19 and a transmission/reception controller 190. In other words, the TV apparatus 1B has the holding section 13B in place of the holding section 13 of the TV apparatus 1 shown in FIG. 2, and additionally has the transmission/reception section 19 and the transmission/reception controller 190 with the display content determination section 12 and the transmission information determination section 14 being removed.

The holding section 13B is a memory for holding image display data and the like to be supplied to the display controller 110. The holding section 13B may include various storage media like the holding section 13. In the following description, function-introductory information DM1, function-briefing information DM2 and detection data DF are transmitted through the holding section 13B. However, the data and information may not be necessarily transmitted through the holding section 13B.

The transmission/reception section 19 has a function to transmit the detection data DF to the video camera 4, and a function to receive the function-introductory information DM1 and the function-briefing information DM2 from the video camera 4. The transmission/reception controller 190 controls transmission/reception operation of the transmission/reception section 19, and has a function to transfer the detection data DF, the function-introductory information DM1 and the function-briefing information DM2 between the transmission/reception section 19 and the holding section 13B.

Video Camera 4

The video camera 4 includes a transmission/reception section 41, a transmission/reception controller 410, a holding section 42, and a transmission information determination section 44.

The transmission/reception section 41 has a function to receive the detection data DF from the transmission/reception section 19 of the TV apparatus 1B, and a function to transmit the function-introductory information DM1 and the function-briefing information DM2 to the transmission/reception section 19. The transmission/reception controller 410 controls transmission/reception operation of the transmission/reception section 41. The transmission/reception controller 410 further has a function to transfer each of the detection data DF, the function-introductory information DM1 and the function-briefing information DM2 between the transmission/reception section 41 and the holding section 42, or the transmission information determination section 44.

The holding section 42 is a memory for holding the function-introductory information DM1, the function-briefing information DM2 and a correspondence table 130. Various storage media may be used for the holding section 42 like the holding section 13.

The transmission information determination section 44 determines transmission information to be transmitted to the second display 2 depending on a current use condition and operation history of the user 5 (by using the predetermined correspondence table 130). A basic function of the transmission information determination section 44 is the same as that of the transmission information determination section 14 in the first embodiment.

Operation and Effect of Video Camera 4 and the Like

Next, operation and effect of each of the video camera 4 and the TV apparatus 1B are described.

In the TV apparatus 1B, the detection data DF acquired by the operation detector 16 are supplied to the transmission/reception section 19 via the holding section 13B and the transmission/reception controller 190, and in turn transmitted to the video camera 4 from the transmission/reception section 19.

In the video camera 4, the transmission/reception section 41 receives the detection data DF, and supplies the data to the transmission information determination section 44 via the transmission/reception controller 410 and the holding section 42. The transmission information determination section 44 determines a recommended function M depending on a current use condition and operation history of the user 5 (by using the predetermined correspondence table 130), and determines transmission information for transmitting function-introductory information DM1 about the recommended function M to the second display 2. The determined function-introductory information DM1 is supplied from the holding section 42 to the transmission/reception section 41 via the transmission information determination section 44 and the transmission/reception controller 410, and in turn transmitted to the TV apparatus 1B from the transmission/reception section 41.

The transmission/reception section 19 of the TV apparatus 1B receives the function-introductory information DM1, and supplies the information DM1 to the transmission section 15 via the transmission/reception controller 190, the holding section 13B and the transmission controller 150. The transmission section 15 transmits the function-introductory information DM1 as the transmission information to the second display 2. After the function-introductory information DM1 is transmitted, the function-briefing information DM2 is transmitted in the same way.

As described above, in the embodiment, transmission operation of the function-introductory information DM1 and the function-briefing information DM2 is indirectly performed during use of the video camera 4 by using (via) the TV apparatus 1B instead of the video camera 4 (electronic device). Consequently, for example, even if an electronic device does not have a communication unit, the same effects as in the first embodiment may be obtained by using the TV apparatus 1B as a communication unit.

While the invention has been described with the embodiments and the modifications hereinbefore, the invention is not limited to the embodiment and the like, and various modifications or alterations may be made. For example, content or kinds of the information (operation screen data, function-introductory information and function-briefing information) described in the embodiments and the like are not limitative, and other content or kinds of information may be used.

While the embodiments and the like have been described with a case as an example where a recommended function M is determined depending on a current use condition or operation history of the user 5, this is not limitative. For example, when an electronic device has an imaging function such as a camera function, imaging data of a face of the user 5 may be used to determine the recommended function M. In such a case, for example, the correspondence table 130 beforehand holds an appropriate function set in correspondence to each of several categories about sex, age, expression and the like of the user. Sex, age, expression and the like of the user are extracted from actually obtained imaging data, and the extracted information and the correspondence table 130 are used to select an appropriate function, and the selected function may be determined as the recommended function M.

Furthermore, while the embodiments and the like have been described with a case as an example where one of several functions is determined as a recommended function M, the number of recommended functions M may be not only one but also two or more. In this case, two or more pieces of function-introductory information DM1 determined as transmission information may be sequentially or randomly transmitted to the second display 2, or may be collectively transmitted to the second display 2 and then sequentially or randomly displayed according to control at the second display 2.

Figure 14A:
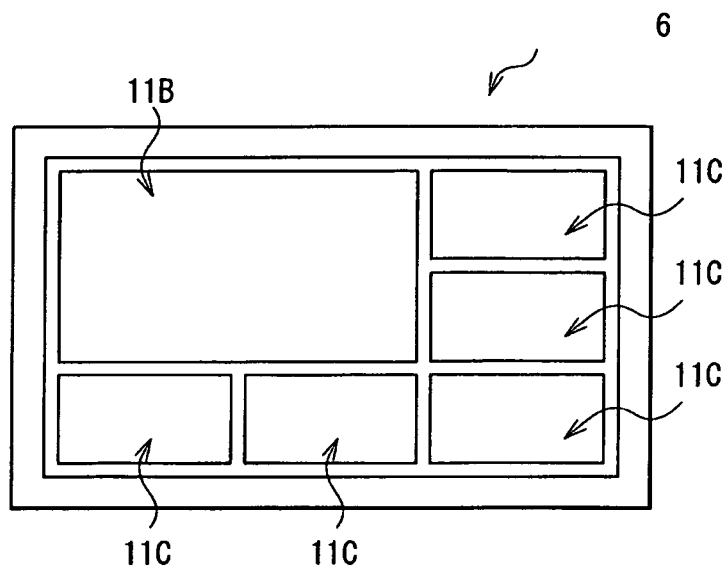
FIGS. 14A and 14B are schematic diagrams showing a multi-screen display and a multi-screen projector showing other application examples of the invention.
Figure 14B:
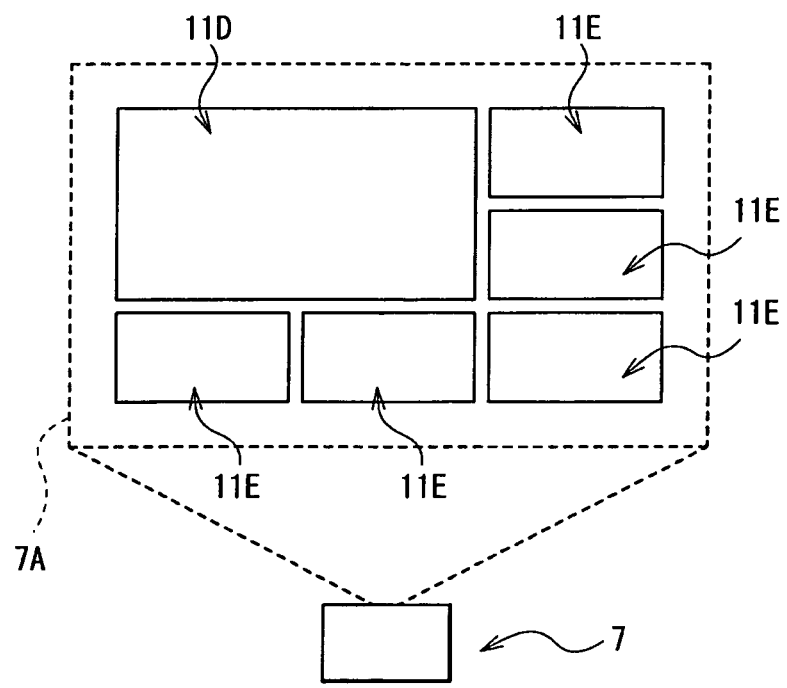

The invention may be applied to a so-called multi-screen display 6 having a main display section 11A and several sub display sections 11C, for example, as shown in FIG. 14A. In such a multi-screen display 6, for example, the function introduction screen A may be continuously displayed on one sub display section 11C. Furthermore, the invention may be applied not only to such a display but also to a projector 7, for example, as shown in FIG. 14B. In this case, for example, a main display 11D and several sub displays 11E may be separately displayed in a projection display region 7A, and, for example, a function introduction screen A for a recommended function M may be continuously displayed on one sub display 11E.

The block configurations of the TV apparatus, the second display and the video camera described in the embodiments and the like are not limitative, and other block configurations may be used. Furthermore, the above-mentioned electronic device and external display device (second display) are not limitative, and the invention may be applied to other types of devices.

Furthermore, while the embodiments and the like have been described with a case as an example where the TV apparatus is connected to the second display through a wiring line, and information is transmitted via the wiring line, such wire transmission is not limitative, and wireless transmission may be used. Moreover, for example, it is acceptable that function-introductory information and the like are outputted from the TV apparatus to a storage device such as USB memory, and the information stored in the USB memory is used for display on the second display.

It should be understood by those skilled in the art that various modifications, combinations, sub-combinations and alterations may occur depending on design requirements and other factors insofar as they are within the scope of the appended claims or the equivalent thereof.

What is claimed is:

1. An electronic device comprising:
a first display device;
a holding section holding plural pieces of function-introductory information each concerning a plurality of functions of the electronic device;
a determination section selecting one out of the plural pieces of function-introductory information, and determining the selected piece of function-introductory information as transmission information to be transmitted to a second display device, said second display device being different from said first display device and being external to said electronic device; and
an output section outputting the transmission information for receipt by the second display device,
said electronic device being configured in a television receiver, and
in which the transmission information being transmitted for receipt by the second display device enables the selected piece of function-introductory information to be displayed on the second display device and not displayed on the first display device.

2. The electronic device according to claim 1, wherein
the output section serves as a transmission section transmitting the transmission information determined by the determination section, to the second display device,
the holding section holds plural pieces of function-briefing information each concerning the plurality of functions, as well, and
when detection of a utilization determination signal follows transmission of the piece of function-introductory information, the transmission section transmits, to the second display device, a piece of function-briefing information corresponding to the piece of function-introductory information transmitted, the utilization determination signal representing a determination to utilize a function introduced by the piece of function-introductory information transmitted.

3. The electronic device according to claim 1, wherein the output section serves as a transmission section transmitting the transmission information determined by the determination section, to the second display device, and
wherein when detection of a utilization determination signal follows transmission of the piece of function-introductory information, the determination section determines a piece of function-introductory information for introducing another function as the transmission information to be transmitted, said another function being different from a function introduced by the piece of function-introductory information transmitted, the utilization determination signal representing a determination to utilize said another function.

4. The electronic device according to claim 1,
wherein the determination section selects one out of the plurality of function-introductory information based on a current condition of operation by a user or a history of operation by the user.

5. The electronic device according to claim 1, wherein the output section serves as a transmission section transmitting the transmission information determined by the determination section, to the second display device, and
wherein the determination section selects two or more out of the plural pieces of function-introductory information, and determines the selected two or more pieces of function-introductory information as the transmission information, and
the transmission section transmits the selected two or more pieces of function-introductory information and a control signal to the second display device, the control signal allowing the display device to display the two or more function-introductory information in random order.

6. The electronic device according to claim 1, wherein the second display device is a digital photo frame, a personal computer, a mobile phone, or a personal digital assistant.

7. A storage medium in which an information processing program is stored, the information processing program allowing a computer:

to select one out of the plural pieces of function-introductory information each concerning a plurality of functions of an electronic device having the computer and a first display device, and to determine the selected piece of function-introductory information as transmission information to be transmitted to a second display device, said second display device being different from said first display device and being external to said electronic device; and then to output the determined transmission information for receipt by the second display device, said electronic device being configured in a television receiver, and in which the transmission information being transmitted for receipt by the second display device enables the selected piece of function-introductory information to be displayed on the second display device and not displayed on the first display device.

8. The storage medium according to claim 7, wherein the outputted transmission information is transmitted to the second display device, and when detection of a utilization determination signal follows transmission of the piece of function-introductory information, a piece of function-briefing information corresponding to the piece of function-introductory information transmitted is transmitted to the second display device, the utilization determination signal representing a determination to utilize a function introduced by the piece of function-introductory information transmitted.

9. The storage medium according to claim 7, wherein the outputted transmission information is transmitted to the second display device, and when detection of a utilization determination signal follows transmission of the piece of function-introductory information, a piece of function-introductory information for introducing another function is determined as the transmission information to be transmitted, said another function being different from a function introduced by the piece of function-introductory information transmitted, the utilization determination signal representing a determination to utilize said another function.

10. The storage medium according to claim 7, wherein, at the time of determining the transmission information to the second display device, two or more pieces of function-introductory information are selected from the plurality of function-introductory information, and the selected two or more pieces of function-introductory information are determined as the transmission information, and the selected two or more pieces of function-introductory information and a control signal are transmitted to the second display device, the control signal allowing the second display device to display the two or more pieces of function-introductory information in random order.

11. A system to enable functions available for use with an electronic device to be provided to a user, said system comprising:

a first electronic device having a first display device; and a second electronic device having (i) a second display device, (ii) a holding section holding a number of pieces of function-introductory information each concerning a number of functions of the second electronic device, (iii) a determination section selecting one piece of function-introductory information and determining the selected piece of function-introductory information as transmission information to be transmitted to the first display device of the first electronic device, and (iii) an output section outputting the transmission information for receipt by the first display device, said second electronic device being configured in a television receiver, said first electronic device being external to said second electronic device such that said first electronic device is external to said television receiver, and in which the transmission information being outputted by the output section of said second electronic device for receipt by the first display device of said first electronic device enables the selected piece of function-introductory information to be displayed on the first display device and not displayed on the second display device.

* * * * *